(12) United States Patent
Liu

(10) Patent No.: US 6,725,880 B1
(45) Date of Patent: Apr. 27, 2004

(54) CONSTANT FLOW CONTROL VALVE

(76) Inventor: Dalin Liu, 12 Lingguang Hutong, Dongcheng District, Beijing 100009 (CN)

( * ) Notice: Subject to any disclaimer, the term of this patent is extended or adjusted under 35 U.S.C. 154(b) by 0 days.

(21) Appl. No.: 10/031,772

(22) PCT Filed: Jun. 14, 2000

(86) PCT No.: PCT/CN00/00157
§ 371 (c)(1),
(2), (4) Date: Jan. 23, 2002

(87) PCT Pub. No.: WO01/09539
PCT Pub. Date: Feb. 8, 2001

(30) Foreign Application Priority Data

Jul. 30, 1999 (CN) .......................... 99217435 U

(51) Int. Cl.[7] .................................. G05D 7/01
(52) U.S. Cl. ...................... 137/501; 137/553
(58) Field of Search ...................... 137/501, 553

(56) References Cited

U.S. PATENT DOCUMENTS

| 3,115,892 A | * | 12/1963 | Brewer | 137/501 |
| 3,344,805 A | * | 10/1967 | Wapner | 137/486 |
| 3,402,735 A | * | 9/1968 | Kates | 137/501 |
| 5,642,752 A | * | 7/1997 | Yokota et al. | 137/413 |
| 5,806,558 A | * | 9/1998 | Greverath | 137/501 |

* cited by examiner

Primary Examiner—Stephen M. Hepperle
(74) Attorney, Agent, or Firm—Kirton & McConkie; MIchael F. Krieger

(57) ABSTRACT

The present invention relates to a regulating valve for regulating and automatically controlling a fluid for a constant flow, comprising a valve body, a valve stem in the body, a pressure difference transducer, a first clack, and a second clack whose main body is a sleeve. At the outside of the sleeve are provided two concentric projects and guiding ribs perpendicular to the projects. The invention, compared to the prior art, has advantages of good performance and reliability, simple and compact structure. The regulating valve according to the invention can automatically regulated with an electric actuator or a pneumatic actuator.

10 Claims, 4 Drawing Sheets

CONSTANT FLOW CONTROL VALVE

FIELD OF THE INVENTION

The present invention relates to a valve, particularly, to a valve for regulating flow of a fluid therethrough. The valve according to the invention can keep flow of a fluid constant.

BACKGROUND OF THE INVENTION

A fluid in a transfer system such as heat supply, air conditioning and water supply needs to be properly distributed in various branches of the system. The flow of the fluid in the branches relies on the pressure of the fluid in the system. In general, it is very difficult to control the flow of the branches in practice because the pressure of the fluid cannot be kept constant. As a result, a lot of energy has been lost.

A number of efforts have been made to overcome the drawbacks in the prior art. For example, people have provided various devices for keeping the flow of the fluid constant even if a pressure difference of the fluid of the transfer system occurs. Chinese utility model patent 96215731.7 (invented by the applicant of this PCT application) disclose a self-regulated balance valve which comprises a main valve body, an assistant part, a worm-drive butterfly clack, a double-seat clack (automatic valve core), and a pressure difference transducer consisting of a membrane, a spring and a membrane case. Although the valve disclosed in this patent may keep a constant flow in some range, the valve is of a complicated structure and a big volume because a fluid channel is needed to match the double-seat clack's work. Moreover, the valve in question can only regulate the fluid with a small pressure change and cannot electrically or pneumatically be controlled.

SUMMARY OF THE INVENTION

Therefore, the object of the present invention is to provide a regulating valve for a constant flow, which has a simple and compact structure, a smaller size, a lower cost, a better property for keeping a constant flow of a fluid to overcome the shortcomings in the prior art. The flow of the fluid can be kept constant within a larger range of the pressure change suffered by the valve, if the flow is predetermined. The regulating valve according to the invention may be controlled not only manually, but also automatically by an electrical or a pneumatic actuator.

According to the present invention, there is provided a regulating valve comprising a valve body with a upper cover and a lower cover, having a upper chamber, a middle chamber and a lower chamber; and a valve stem, a sealing stuff, a sealing flange and an actuator being mounted to the center of the upper cover. A first clack positioned within the upper chamber and the middle chamber of the valve body is connected to the valve stem, the outer surface of the first clack is associated with the inner surface of the middle chamber of the valve body and faced to a throttle hole positioned on the inner surface of the middle chamber, the lower end of the valve stem is connected to one end of a pressure difference transducer, another end of the pressure difference transducer is connected to a second clack, which is associated with two concentric seats positioned between the middle chamber and the lower chamber of the valve body, a first channel is provided between the upper portion of an outlet chamber of the valve body and the upper chamber, and a second channel is provided between the upper chamber and the inside of the pressure difference transducer so that the outlet chamber is communicated with the inside of the pressure difference transducer.

The first clack in the invention may comprise a connecting sleeve at the upper portion thereof, to which the lower end of the stem is connected, and a sleeve at the lower portion, whose lower end is of an opening of an oblique plane. A sealing ring may be positioned in an O-flute at the outside of the connecting sleeve to attach the inner surface of the upper chamber. A hole is provided at the upper end of the sleeve in this invention.

The second clack used in the invention may be a cylinder whose upper end is closed, two circular projections are provided at the outside of the second clack, 3–6 guiding ribs perpendicular to the circular ribs are provided at the outside of the second clack to form 3–6 holes at the outside of the upper portion of the second clack, and on the upper end of the second clack is provided a square projection extended upwards through the square hole of the first clack.

In the regulating valve according to the invention, the pressure difference transducer is selected from those conventionally used in the art such as made of a bellows, a rubber membrane or a sliding piston.

The actuator used in the invention may be a manual, an electrical, or pneumatic one. The actuator is connected to a pointer fastened by a locking bolt. The pointer indicates the scale of a dial on the upper surface of the upper cover for showing the flow.

The regulating valve according to the invention further comprises a screw rod installed in the core of the valve stem. The lower end of the screw stem is connected to a cover for covering a spring connected to the bottom of the inner of the pressure difference transducer.

The regulating valve according to the invention will be described as follows.

First, the first clack is driven by rotating the valve stem via the actuator such as a handwheel. When the pointer on the handwheel rotates to a position where the scale shows the desired flow, the handwheel is locked by the locking bolt. In this case, the setting of the flow is completed. Thereafter, when the pressure of the fluid suffered by the regulating valve changes, the second clack is moved up and down together with the movement of the pressure difference transducer. This regulates the change of the flow caused by the pressure changes to keep the flow through the valve constant. Alternatively, an automatically regulating valve according to the present invention may be provided in an automatic control system, in which the valve is driven by an electrical or a pneumatic actuator instead of the handwheel. In this case, it may avoid the actuator of the valve being initiated frequently due to the pressure change, so as to improve the stability of the system and prolong the life of the valve.

DETAILED DESCRIPTION OF THE PREFERRED EMBODIMENT OF THE INVENTION

Example 1

Figure 1:
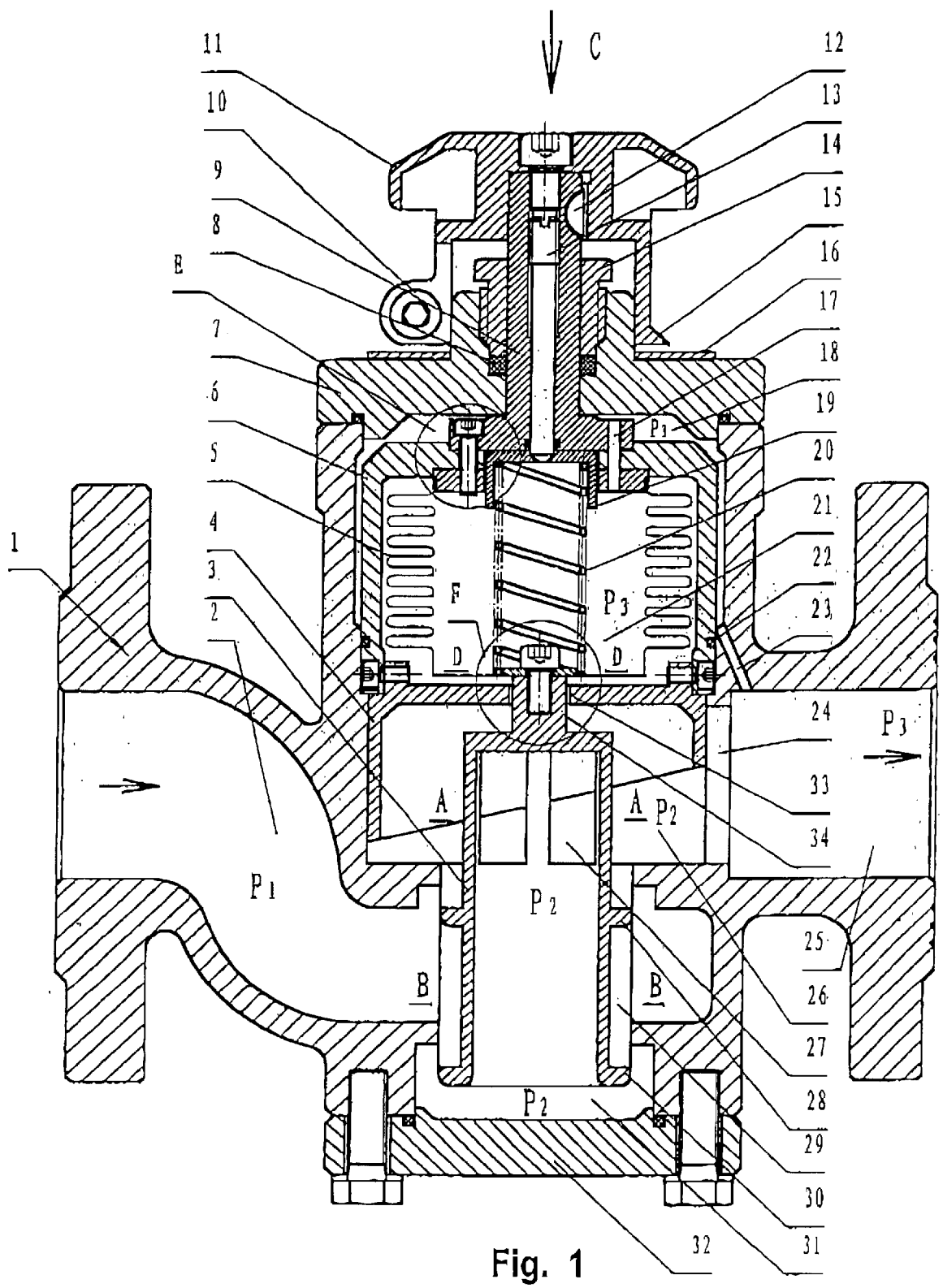
FIG. 1 is a schematic view of the structure according to one embodiment of the present invention.
Figure 2:
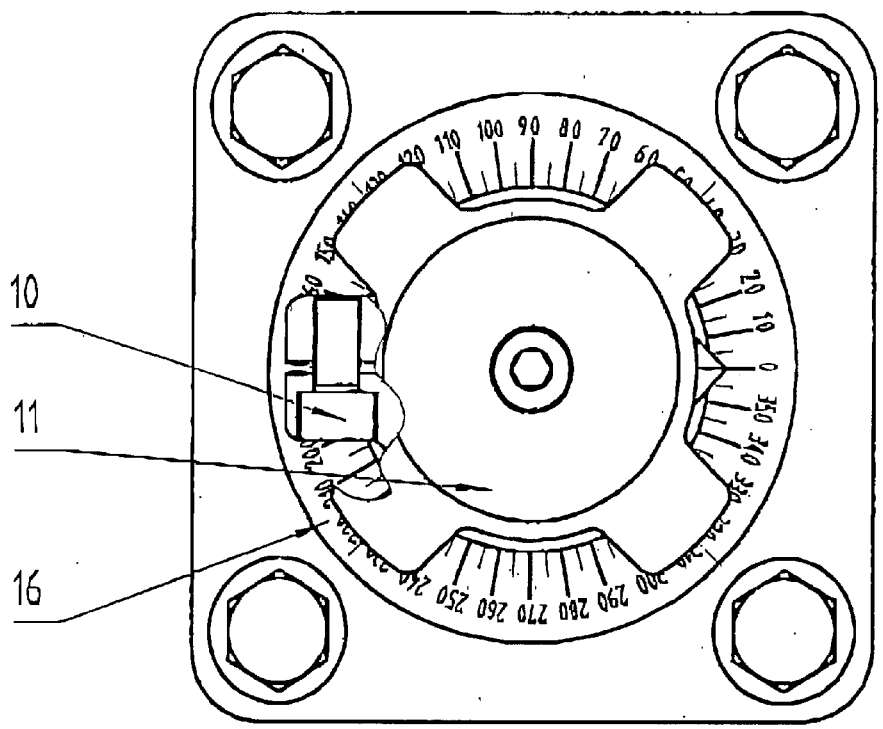
FIG. 2 is a sectional view taken in C—C direction in FIG. 1.
Figure 3:
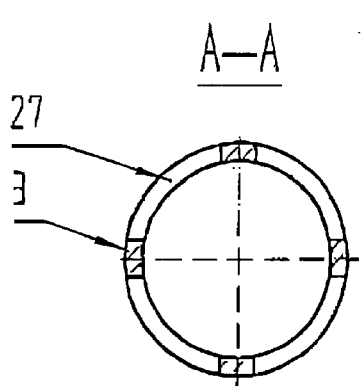
FIG. 3 is a sectional view taken at A—A in FIG. 1.

Referring to FIGS. 1 through 7B, a regulating valve for regulating and automatically controlling the flow of a fluid in this example includes a body (1) equipped with a upper cover (7) and a lower cover (32), a valve stem (9), a first clack (4), a pressure difference transducer (5) and a second clack (3). The valve stem (9) extends upwards through the upper cover (7) and is sealed by a sealing stuff (8) and a sealing flange (14). The valve stem (9) is connected to a handwheel (11) through a key (12). A pointer (15) and a locking bolt (10) are mounted to the handwheel (11). The pointer is directed to a scale (16) provided on the upper cover (7) to show the flow of a fluid passing through the valve.

The first clack (4) comprises a connecting sleeve (6) at the upper portion connected to the lower end of the valve stem (9). The lower end of the first clack is of an opening of an oblique plane. The lower end of the connecting sleeve (6) including a square hole (33). The inner surface of a middle chamber (26) of the body includes a throttling bore (24) faced to the outside of the lower portion of the first clack and associated with the same. When the first clack is rotated, the opening of the bore (24) varies to allow the fluid through the valve in different flows. Thus, the flow of the fluid may be regulated by rotating the first clack which is driven by the handwheel. For example, when the pointer is directed to a number of 0 on the scale (16), it means a minimum flow. While the pointer is directed to a number of 270 on the scale, that means a maximum flow. A sealing ring (22) is provided in an O-flute positioned at the outside of the connecting sleeve (6) to sealedly match the inner side of an upper chamber (18) of the body.

Figure 4:
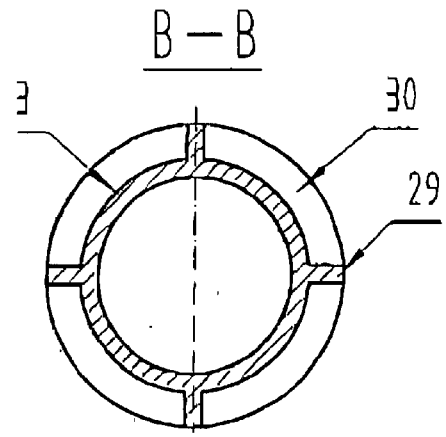
FIG. 4 is a sectional view taken at B—B in FIG. 1.
Figure 5:
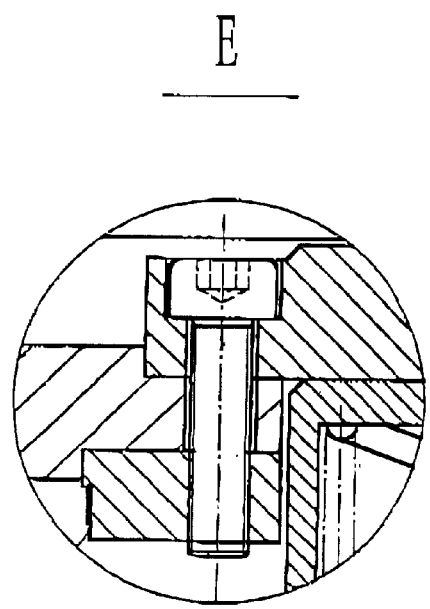
FIG. 5 is an expanded view of the portion of FIG. 1 labeled as E in FIG. 1.
Figure 6:
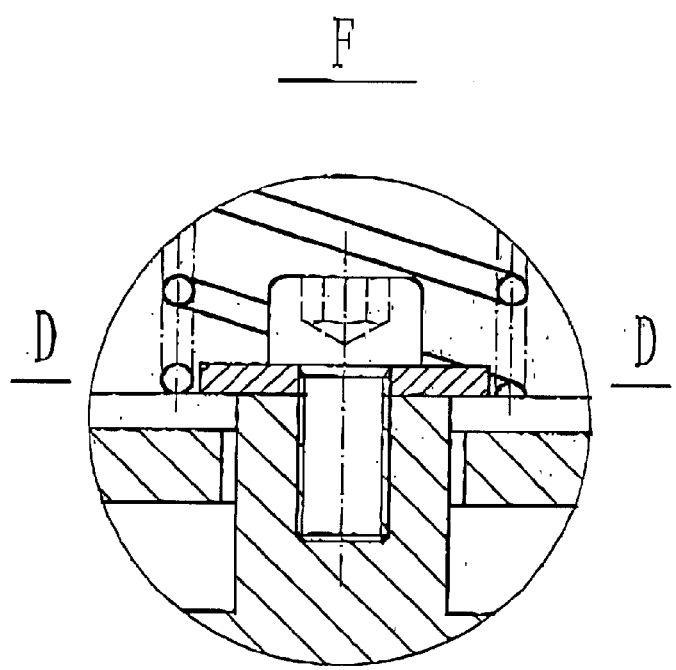
FIG. 6 is an expanded view of the portion of FIG. 1 labeled as F in FIG. 1.
Figure 7A:
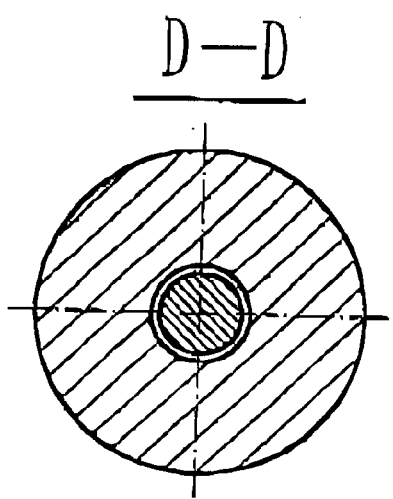
FIG. 7A is an embodiment of a sectional view taken at D—D in FIG. 1.
Figure 7B:
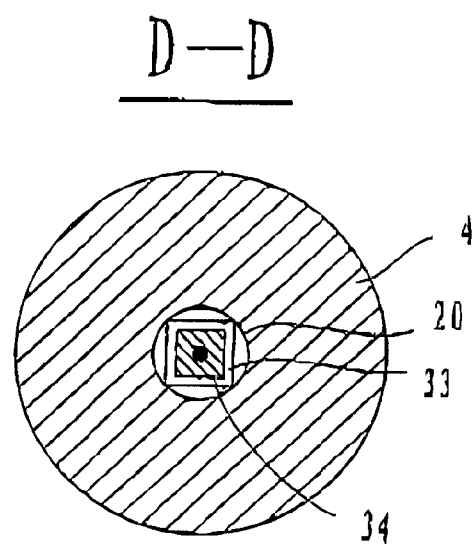
FIG. 7B is another embodiment of a sectional view taken at D—D in FIG. 1.

The lower end of the valve stem is connected to the upper end of the pressure difference transducer (5) passing through the upper end of the connecting sleeve (6). The lower end of the pressure difference transducer (5) is connected to a square projection (34) extended from the upper end of the second clack (3) through a square hole (33). Two concentric valve seats in an inlet chamber (2) are formed to divide the body into the middle chamber (26) and a lower chamber (31) as well as the upper chamber (18). Two circular projections (28, 30) are formed at the outside of the second clack to match the two valve seats. At the outside of the second clack, four guiding ribs (29) perpendicular to the projects (28) are provided, as shown in FIG. 4. The ribs (29) may make the second clack stably move up and down. The second clack (3) can regulate the flow change caused by the pressure change of the fluid.

The pressure difference transducer (5) is those conventionally used in the art. In this embodiment, it is a metal-bellows.

A first channel (17) is formed through the lower end of the valve stem (9), the upper end of the connecting sleeve (6) and the upper end of the pressure difference transducer (5) to make the inside (21) of the pressure difference transducer (5) communicated with the upper chamber (18). A second channel (23) is formed between an outlet chamber (25) and the upper chamber (18) of the valve body. The first channel and the second channel make sure a pressure of the fluid in the outlet chamber (25), P3, to be same as that in the inside (21) of the pressure difference transducer (5).

The pressure difference transducer (5) and the second clack rotate as the valve stem (9) drives the first clack (4) to rotate. The guiding ribs (29) may clear impurities in the fluid to prevent them from blocking the fluid and keep sensitivity of the movement of the second clack.

A screw rod (13) is provided through the valve stem to attach a cap (19) which covers a spring (20), whose lower end is connected to the project (34). To regulate the screw rod may change the force provided by the spring (20), thereby to regulate the flow of the fluid.

Since in this embodiment, the valve stem (9), the first clack (4), the second clack (3), the pressure difference transducer (5), the regulating rod (18) and the spring (20) are arranged along an ax, the regulating valve is of a compact structure while having functions of flow regulation, pressure compensation and micro-regulation of flow.

The regulating valve according to the invention works as follows. Referring to FIG. 1, the fluid entering the inlet chamber (2) along the arrow are divided into two portions by the outside of the second clack (3), one of which enters the middle chamber (26) over the projection (28) while the other enters the lower chamber (31) over the projection (30). The fluid entered the lower chamber (31) then enters the middle chamber (26) through through holes (27). Two forces respectively acting the two projections (28, 30) caused by the pressure difference of the fluid between the inlet chamber and the middle chamber will be eliminated because they are identical but in an opposite direction. Therefore, the second clack (3) is still kept stable.

The fluid from the middle chamber arrives at the outlet chamber (25) through the throttling bore (24). The fluid in the regulating valve is of three pressures in the action of the first clack and second clack. The pressure in the inlet chamber P1 is the highest one, the pressure in the middle chamber (26) and the lower chamber (31) is reduced, named as P2, and the pressure in the outlet chamber (25) P3 is the lowest. In the presence of the second channel (23), the inside (21) of the pressure difference transducer (25) is of a pressure P3. Pressure difference (P1–P3) is called total pressure difference of the regulating valve, and pressure difference (P2–P3) is called flowregulating pressure difference that is also the pressure difference between the inside of the transducer (25) and the outer of the transducer (25).

The position of the first clack (4) opposite to the throttling bore (24) is set in accordance with a predetermined flow. When the total pressure difference is suddenly increased, the flow has accordingly a temporary change to result in the increase of the flow-regulating pressure difference. As a result, the pressure difference transducer (5) is contracted to make the second clack (3) move upwards. This causes the flow temporarily reduced since the gaps between the projections (28, 30) and the valve seats become smaller. In this case, P2 is reduced to cause the flow—regulating pressure difference decreased and the predetermined flow is recovered. To the contrary, in case the total pressure difference is reduced, the flow becomes temporarily lowered to cause the flow-regulating pressure difference decreased. As a result, the pressure difference transducer (5) expands to make the second clack (3) move down. This causes P2 increased. The flow-regulating pressure difference is accordingly increased and the predetermined flow is recovered.

When the handwheel (11) is driven to make the first clack (4) rotate to a new position, the flow-regulating pressure difference is temporarily changed. In this case, however, the pressure difference transducer (5) will quickly regulate a pressure change via the second clack's movement. The new flow will be kept constant. It is understood that the flow cannot be kept constant in case the total pressure difference gores beyond the range of about 0.02 Mpa–0.4 Mpa. Within this range, the flow set will not be changed with the change of the total pressure difference but depends on the opening of the throttling bore (24).

Because the main body of the second clack is a cylinder sleeve, a specific fluid flowing channel formed in the valve body as in the prior art is not required to make the structure of the present invention simpler and the manufacture easier. In addition, the second clack is provide with the guiding ribs to make the guiding rods and holes of the double-seat clack in the prior art unnecessary. As a result, the structure of the invention is simplified and the risk that the clack is blocked by impurities in the fluid is avoided. In sum, the regulating valve of the present invention are of advantages of better performance, higher reliability, simpler and more compact structure, and lower cost, over the prior art. The regulating valve of the invention may manually be controlled or may automatically regulated by en electric and pneumatic actuator.

What I claim is:

1. A regulating valve for a constant flow of a fluid comprising:

a body with a upper cover and a lower cover, having an upper chamber, a middle chamber, a lower chamber, an inlet chamber between the middle chamber and the lower chamber, and an outlet chamber faced to the middle chamber;

a valve stem extended upwards from the upper chamber through the center of the upper cover;

an actuator mounted to the valve stem;

a first clack comprising a connecting sleeve positioned in the upper chamber and a sleeve positioned in the middle chamber connected to the connecting sleeve, wherein the upper end of the connecting sleeve is connected to the valve stem, the lower end of the sleeve is an opening of an oblique plane and the upper end of the sleeve includes a square hole;

a pressure difference transducer positioned within the connecting sleeve, whose upper end is connected to the valve stem;

a second clack positioned within the middle chamber, the inlet chamber and the lower chamber, wherein a square projections extended upwards from the upper end of the second clack through the square hole is connected to the lower end of the pressure difference transducer, two circular projections formed at the outside of the second clack are matched with two concentric valve seats within the inlet chamber, and 3–6 through holes are formed at the upper portion of the second clack, a first channel formed between the outlet chamber and the upper chamber;

a second channel formed between the inside of the pressure difference transducer and the upper chamber;

wherein when the first clack is driven by the actuator to rotate, the opening of a throttling bore faced to the outlet chamber may vary to regulate the flow of the fluid.

2. The regulating valve according to claim 1, wherein a screw rod is installed in the core of the valve stem, the lower end of the screw rod is connected to a cover within the pressure difference transducer for covering a spring connected to the bottom of the inside of the pressure difference transducer.

3. The regulating valve according to claim 1, wherein a sealing ring is positioned in an O-flute at the outside of the lower portion of the connecting sleeve to attach the inner surface of the upper chamber.

4. The regulating valve according to claim 2, wherein a sealing ring is positioned in an O-flute at the outside of the lower portion of the connecting sleeve to attach the inner surface of the upper chamber.

5. The regulating valve according to claim 1, wherein a plurality of guiding ribs perpendicular to the two circular projections are provided at the outside of the second clack.

6. The regulating valve according to claim 2, wherein a plurality of guiding ribs perpendicular to the two circular projections are provided at the outside of the second clack.

7. The regulating valve according to claim 3, wherein a plurality of guiding ribs perpendicular to the two circular projections are provided at the outside of the second clack.

8. The regulating valve according to claim 4, wherein a plurality of guiding ribs perpendicular to the two circular projections are provided at the outside of the second clack.

9. The regulating valve according to claim 1, wherein the pressure difference transducer comprises a bellows, a rubber membrane or a sliding piston.

10. The regulating valve according to claim 1, wherein the actuator is connected to a pointer fastened by a locking bolt which indicates the scale of a dial on the upper surface of the upper cover for showing the flow of the fluid.

\* \* \* \* \*